Oct. 4, 1932.  C. F. KEALE, JR  1,880,960
AERIAL CAMERA
Filed June 3, 1929   2 Sheets-Sheet 1
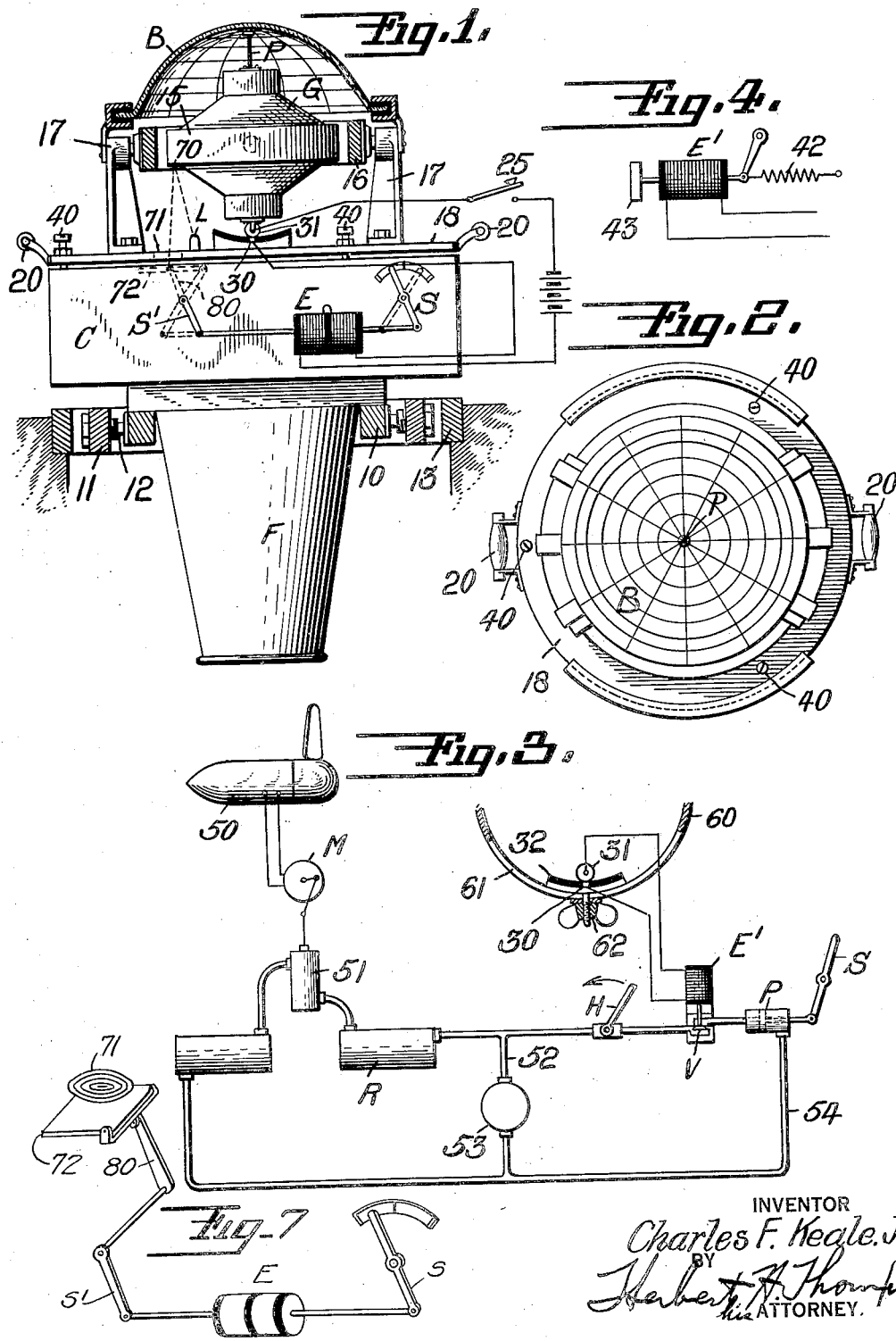
INVENTOR
Charles F. Keale, Jr.
BY
Herbert H. Thompson
his ATTORNEY.

Oct. 4, 1932.　　C. F. KEALE, JR　　1,880,960
AERIAL CAMERA
Filed June 3, 1929　　2 Sheets-Sheet 2

INVENTOR
Charles F. Keale, Jr.
BY
Herbert H. Thompson
his ATTORNEY.

Patented Oct. 4, 1932

1,880,960

UNITED STATES PATENT OFFICE

CHARLES F. KEALE, JR., OF STEWART MANOR, LONG ISLAND, NEW YORK

AERIAL CAMERA

Application filed June 3, 1929. Serial No. 367,987.

This invention relates to aerial cameras, that is to say, cameras employed in taking photographs from aircraft. The problem in taking pictures from an aircraft arises because of the fact that the aircraft is constantly changing its position, and for the purposes of photography it is essential that the picture be taken with the axis of the camera vertical or at a predetermined angle, and that all pictures so taken shall be at the same angle so that when a composite picture is made all of the parts will fit together and show the same perspective. It is the principal object of my invention, therefore, to provide, first, means which will respond to the position of the optical axis of the camera and indicate to the operator the position of the said axis, in combination with means for controlling the operation of the camera shutter to prevent operation thereof unless and until the optical axis of the camera is in the desired predetermined position.

A further object of my invention is to provide means for giving an indication of the inclination of the camera axis and for making a permanent record of said inclination. More particularly it is an object of the invention to provide for making a photographic record of the inclination of the camera axis on the same film which bears the main photograph.

Further objects and advantages of the invention will be disclosed in the following detailed description thereof.

In the accompanying drawings,

Fig. 1 is a front elevation, partly sectioned vertically, of an aerial camera embodying one form of my invention.

Fig. 2 is a plan view of the Fig. 1 device.

Fig. 3 is a modified form of my invention shown largely diagrammatically and disclosing an alternative means for automatically controlling the operation of the camera shutter in response to the position of the optical axis of the camera.

Fig. 4 is a modified form of shutter operating mechanism.

Fig. 7 is a detail view of the operating mechanism for indicating inclination on the picture.

Figure 5:
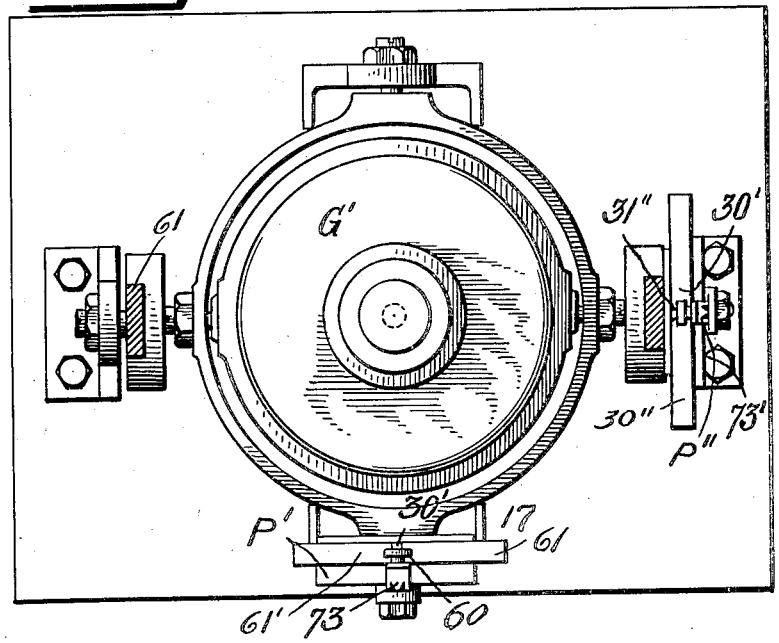
Fig. 5 is a plan view of a modified form of my invention disclosing a different means responsive to the position of the optical axis of the camera and means for indicating such position.

Referring to the drawings, I have disclosed a camera indicated generally by the letter C and having a focusing compartment F, the said camera being supported for universal movement by means such as a ring 10 fixed thereto and pivoted within a ring 11 on axis 12, said ring 11 being in turn pivoted in a ring 13 on an axis at right angles to axis 12. I provide a means responsive to the position of the optical axis of the camera which in Fig. 1 is shown as substantially vertical. This means may take the form of a pendulous gyroscope, which may be known as a gyro vertical, indicated by the letter G, mounted with its spinning axis vertical within gimbal rings 15—16 for universal movement, said ring 16 being supported in bracket 17 on a base 18 mounted upon the camera C. Said gyro G tends to maintain its spinning axis vertical at all times regardless of the movements of the craft upon which the camera may be mounted, so that it will indicate the inclination of the optical axis with respect to the vertical. For providing an indication of such inclination, I may cause a pointer P, which is in effect an extension of the gyro axis, to register with a bowl having latitudinal and longitudinal markings thereon. By this means it is possible at a glance to determine not only the degree of deviation of the gyro axis from the vertical but also the direction of such deviation, and it is then a simple matter for the operator to move the camera in an opposite direction until the pointer P coincides with the zenith of the bowl B. The platform 18 may be provided with handles 20 for facilitating the manipulation of the camera.

For preventing operation of the camera shutter when the optical axis of the camera is not vertical, I may provide the following mechanism: The shutter-operating lever S may be controlled by means such as an electro-magnet E which is so wired that merely closing a circuit by the operator actuating a key 25 will not energize the electro-magnet to cause actuation of the shutter unless the optical axis of the camera is vertical. This can be determined by providing in the circuit of the electro-magnet E a pair of contacts, one of which 30 may be carried by the platform 18 and hence movable with the camera, while the other contact 31, which may be in the form of a trolley, is carried by the gyro G, preferably in the vertical axis thereof. The contact 30 may be the very center of a circular bowl and surrounded by insulating material 32. The trolley 31 is adapted to ride within said bowl, and, when the optical axis of the camera deviates from the vertical, trolley 31 moves out of engagement with contact 30. It will thus be seen that only when the camera axis is vertical will the contacts 30 and 31 engage so that when key 25 is depressed, electro-magnet E will be energized to actuate shutter S. The fineness of adjustment may be controlled by the diameter of contact 30. I have thus provided in effect a two-part or joint control for the shutter, the first of which is the control by the position of the camera axis for rendering the shutter effective or ineffective, and the second of which is the control by the operator for actuating the shutter. The concurrence of both controls is necessary to effect operation of the shutter.

The operation of this form of the invention may be readily apparent. The operator desiring to take a picture depresses key 25. If the shutter is not actuated he knows that the magnet, and hence, the shutter, has not been rendered effective because the optical axis of the camera is not vertical, and by taking hold of handles 20 and watching the position of pointer P with respect to the markings on bowl B he can bring the optical axis to the vertical. This renders the shutter effective and, therefore, depressing of key 25 will actuate the shutter.

It is sometimes desired to take pictures at an angle to the vertical and the above invention may be readily adapted to any angle to the vertical as well as in the vertical itself. If it is desired to take pictures with the camera axis at an angle to the vertical and to prevent operation of the shutter unless said camera is in the said predetermined position, I may set the optical axis of the camera at the desired angle to the vertical initially by operating adjusting screws 40 to give the camera the desired inclination with respect to platform 18 and hence with respect to the vertical axis of gyro G. It will thus be apparent that platform 18 will be horizontal and pointer P will register with the zenith or zero marking of the bowl B only when the optical axis of the camera is in the said predetermined position, that is, at the fixed angle with respect to the vertical.

I may provide means not only for indicating the inclination of the camera axis but for making a permanent record of said indication, preferably on the same film upon which the picture is made so that the photograph will bear its own record of the camera axis at the time the said picture was taken. While I may provide means for taking a photograph of the inclination indication given by pointer P on globe B, I have shown an additional means for indicating said inclination which may take the form of a light L adapted to have its rays reflected by a small mirror surface 70 preferably formed on the gyro case G, the said rays being reflected upon a ground glass 71 which may bear concentric circles like those of globe B (Fig. 7). The photograph of the position of the light ray on said ground glass 71 may be made upon the same film upon which the main picture is made, preferably in the otherwise unused margin of the said film. The photograph of said indication may be made simultaneously with the taking of the main picture by causing electro-magnet E, which controls lever actuating shutter S for the main picture, to actuate also a crank S' for controlling a shutter 72 adjacent the said ground glass 71, so that simultaneous actuation of the two shutters will take place to cause simultaneous photographing of the inclination indication and of the main picture. As shown, the shaft of crank S' extends within the camera and carries a second crank arm 80 pinned at its upper end to shutter 72 so as to open the same when the arm S is moved to the dotted line position in Fig. 1 or the full line position in Fig. 7.

I may provide various modifications for certain of the elements of the Fig. 1 form of my invention, as will be obvious. Thus in Fig. 1, I have shown an electro-magnet E of the double wound type, but it will be apparent that I may substitute an electro-magnet E' of a single winding where the armature is normally biased in one direction by means of a spring 42 against which the energized electro-magnet E' operates to attract the armature 43.

A modified form of shutter-operating mechanism is disclosed in Fig. 3. An electro-magnet E' is shown as adapted to be energized from the contacts 30 and 31 as in Fig. 1, but instead of directly operating the shutter, said electro-magnet may control a fluid pressure system through a valve V to prevent or permit fluid under pressure to operate a piston P to actuate the shutter S. The said fluid under pressure may be supplied through the medium of a wind driven electric generator 50 which is mounted on the craft and is operated by the travel of the craft through the air, said generator operating a motor M to actuate a pump 51 to pump fluid to reservoir R and then through a bypass 52 and bleeder valve 53 back to the pump 51. When, however, the operator desires to take a picture he may operate a control handle H to open the passage to the valve V and the fluid under pressure operates piston P to open the shutter provided the electro-magnetic lock E' has opened valve V. Here too it will be obvious that merely actuating handle H will not cause operation of the shutter before the optical axis of the camera has reached its predetermined position because in that case electro-magnet E will not have been energized to open valve V.

I have described hereinbefore one method whereby my invention prevents operation of the shutter until the gyro reaches a predetermined position which is at an angle to the vertical. This means included the adjusting screws 40 whereby the optical axis of the camera could be given an initial inclination with respect to the platform 18. I may obtain the same result by making the contact 30 adjustable with respect to the contact 31. For this purpose I may mount the contact 30 and its bowl 32 within a circular support 60 having a slot 61 therein in which operates a locking screw 62 which normally locks the contact 30 to the support 60. It will be obvious that by displacing contact 30 with respect to the vertical it will be necessary to incline the optical axis of the camera in order to bring contact 30 again into engagement with contact 31. In other words, a fixed inclination must be imparted to the optical axis before the shutter can be operated.

Figure 6:
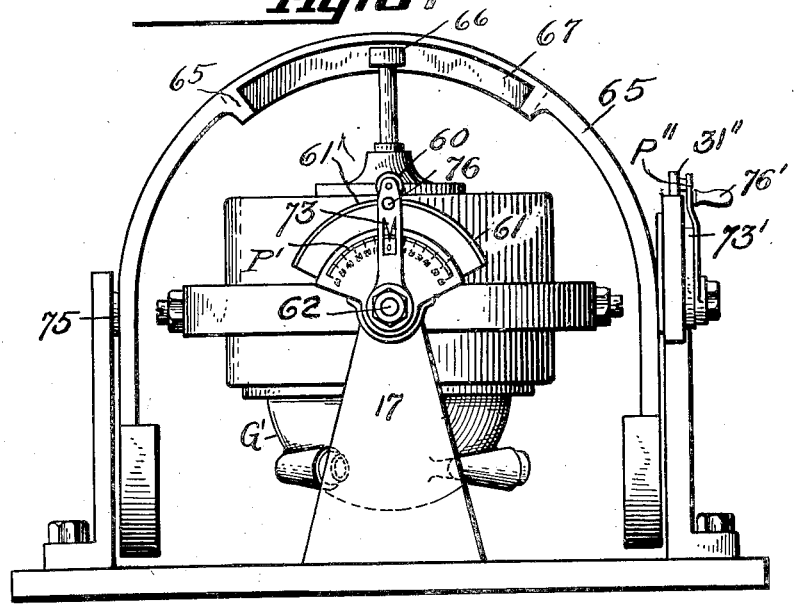
Fig. 6 is a front elevation of the Fig. 5 form of my invention.

In Figs. 5 and 6, I have shown a modified form of means responsive to inclination of the optical axis of the camera and for indicating such inclination. The gyro pendulum G' may be of the same type as in Fig. 1 or it may be, as shown, of the type disclosed in the patent to M. F. Bates, No. 1,518,892, granted December 9, 1924 for self-damping gyro pendulum. Further, instead of a single indicator P operating in conjunction with a circular bowl having latitudinal and longitudinal markings thereon, I may provide two separate indicators P' and P'' mounted in planes at right angles to each other and substantially coincident with the horizontal axes of mounting of the gyro G'. The gyro may be provided with a trolley 60 engaging fixed contacts 61, 61'. Movements of the camera about axis 62 of the gyro will, therefore, cause movement of said trolley over said contacts 61 and said movements will become apparent by index 73 moving with respect to scale P' carried by the fixed bracket 17. Movement of the camera about an axis at right angles to axis 62 of the gyro will cause movement of a frame or bail 65 around axis 75 by reason of the engagement of roller 66 with track 67 on the bail to cause movement of index 73' with respect to scale P''. A trolley 31' and contacts 30' and 30'' are provided between index 73 and scale P' and a similar trolley 30''. The circuit through electro-magnet E now includes both sets of trolleys and contacts 30', 30'', and 31' and 60, 61 and 61', so that it is not until the camera has been adjusted in two planes at right angles to each other to bring the optical axis thereof to the predetermined position that electro-magnet E may be actuated upon depressing key 25.

In this form of the invention it will be obvious that if an inclination of the gyro axis is desired, trolley 31' or 60, or both, may be actuated with respect to its contact by moving handle 76 or 76', or both, so that it will be necessary to impart an inclination to the gyro axis before the contacts can engage their respective trolleys.

In acordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In combination, a camera, a support in which said camera is movably mounted, means for operating said camera, means whereby the position of the optical axis of said camera may be varied, and means for preventing operation of said camera until said axis is in a predetermined position, said last-named means including locking means for said operating means, means responsive to the position of said axis, contacts between said camera and said last-named means, and means whereby said contacts control said locking means.

2. In combination, a camera, support in which said camera is movably mounted, means for operating said camera, means whereby the position of the optical axis of said camera may be varied, and means for preventing operation of said camera until said axis is in a predetermined position, said last-named means including locking means for said operating means, means responsive to the position of said axis, contacts between said camera and said last-named means, means whereby said contacts control said locking means, and means whereby the relative positions of said contacts may be adjusted to vary said predetermined position.

3. In combination, a camera, a support in which said camera is movably mounted, means for operating said camera, means whereby the position of the optical axis of said camera may be varied, and means for preventing operation of said camera until said axis is in a predetermined position, said last-named means including locking means for said operating means, means responsive to the position of said axis, contacts between said camera and said last-named means, means whereby said contacts render said locking means effective or ineffective, and hand-operated means for actuating said locking means.

4. In combination, a camera having a shutter, means for operating said shutter, a gyro vertical freely mounted on said camera means whereby the position of the optical axis of said camera may be varied, separate means responsive to inclination of said axis with respect to said gyro vertical, about each of a plurality of axes, means actuated by an operator, and means whereby said shutter-operating means is controlled jointly by said responsive means and said means actuated by an operator.

5. In combination, a camera, a support in which said camera is movably mounted, means for operating said camera, means whereby the position of the optical axis of said camera may be varied, and means for preventing operation of said camera until said axis is in a predetermined position, said last-named means including locking means for said operating means, means responsive to the position of said axis, and means whereby said responsive means controls said locking means.

6. In combination, a camera, means for operating said camera, means whereby the position of the optical axis of said camera may be varied, means responsive to inclination of the camera axis for indicating said inclination, and means whereby a record of said inclination is made on the main film or plate of said camera when said operating means is actuated.

7. In combination, a camera, means for operating said camera, means whereby the position of the optical axis of said camera may be varied, means responsive to inclination of the camera axis for indicating said inclination, and means whereby said indication is photographed on the camera film when said operating means is actuated.

8. In combination, a camera, means for operating said camera, means whereby the position of the optical axis of said camera may be varied, means for preventing operation of said camera until said axis is in a predetermined position, means responsive to inclination of the camera axis for indicating said inclination, and means whereby a record of said indication is made when said operating means is actuated.

9. In combination, a camera, means for operating said camera, means whereby the position of the optical axis of said camera may be varied, means for preventing operation of said camera until said axis is in a predetermined position, means responsive to inclination of the camera axis for indicating said inclination, and means whereby said indication is photographed on the camera film when said operating means is actuated.

10. In combination, a camera, means for operating said camera, a gyro vertical freely mounted on said camera, means whereby the position of the optical axis of said camera may be varied with respect to said gyro vertical means responsive to the relative position of said axis and gyro vertical, and means whereby said responsive means controls said operating means.

11. In combination, a camera, means for operating said camera, a gyro vertical freely mounted on said camera, means whereby the position of the optical axis of said camera may be varied with respect to said gyro vertical, and means for preventing operation of said operating means unless said axis bears a predetermined relationship to said gyro vertical.

In testimony whereof I have affixed my signature.

CHARLES F. KEALE, Jr.